United States Patent [19]

Holmes

[11] 4,351,626
[45] Sep. 28, 1982

[54] SELF-LOCKING THREADED FASTENER

[76] Inventor: Horace D. Holmes, 28576 Green Willow, Farmington Hills, Mich. 48024

[21] Appl. No.: 141,535

[22] Filed: Apr. 18, 1980

[51] Int. Cl.³ ............................................. F16B 39/30
[52] U.S. Cl. ................................. 411/311; 10/152 T; 411/411
[58] Field of Search ............... 411/311, 310, 309, 308, 411/307, 259, 414, 423, 411, 285; 10/152 T

[56] References Cited

U.S. PATENT DOCUMENTS

| 1,016,897 | 2/1912 | Ryan | 411/308 |
| 2,377,405 | 6/1945 | Davies | 411/309 |
| 3,247,877 | 4/1966 | Evans | 411/311 |
| 3,721,283 | 3/1973 | Evans | 411/311 |
| 3,731,725 | 5/1973 | Brophy | 151/22 |
| 3,907,017 | 9/1975 | Stanwick | 151/22 |
| 4,150,702 | 4/1979 | Holmes | 411/310 |
| 4,171,012 | 10/1979 | Holmes | 411/285 |

FOREIGN PATENT DOCUMENTS 548516 10/1942 United Kingdom ................ 411/420

Primary Examiner—Ramon S. Britts
Attorney, Agent, or Firm—Krass, Young & Schivley

[57] ABSTRACT

A self-locking fastener combination is provided with a thread construction having a thread which deforms to securely lock the fastener when a set of male and female members are threaded together and is reformed upon unthreading of the members to allow subsequent reuse thereof. The female member is provided with a conventional thread while the male member has a special helical thread defined by leading and trailing flanks in which a portion of the leading flank diverges away from the leading flank of the female member to produce a space between the threads at the male thread root. A portion of the male thread root is truncated and is of lesser depth than the female thread such that part of the female thread crest firmly engages and is deformed by the truncated male thread root into the space adjacent such root when the members are threaded together. The deformed female thread crest produces firm metal-to-metal contact between the members completely around several revolutions of the circumference of the threads in order to preclude lateral movement of one member relative to the other and resultant loosening of the fastener when subjected to vibration. Another portion of the male thread is complementally identical to the female thread and causes the deformed female crest to reform to its original shape when the members are unthreaded, thus allowing each member to be reused.

22 Claims, 6 Drawing Figures

SELF-LOCKING THREADED FASTENER

TECHNICAL FIELD

The present invention generally relates to locking fasteners of the threaded type, and deals more particularly with a male and female thread construction in which one thread is deformed during threading of the members to produce locking of the fastener.

BACKGROUND ART

Standard manufacturing tolerances inherent in the threaded portions of conventionally threaded fasteners results in small air spaces between the mated male and female threads which allows the fastener combination to shift laterally or "rock" when subjected to vibration or shock. This lateral movement of the threads is sufficient to overcome starting friction between those portions of the thread which are in frictional contact with each other. When the fastener is tightened, a substantial amount of potential energy is stored in the threads (due to stresses), which is transformed into kinetic energy as the threads laterally shift with respect to each other thereby unlocking the threads and loosening the fastener. This undesirable situation is particularly acute in assemblies which are subjected to constant vibration, such as steering assemblies, drive trains, engines, etc.

Locking thread constructions have been devised in the past in an attempt to overcome the problem mentioned above. These past attempts have involved either filling the threads with vibration absorbing material or deflecting the threads in order to increase the level of friction therebetween. For example, one typical locking thread construction is shown in my prior U.S. Pat. No. 4,150,702 which discloses a fastener combination in which conventional male threads are deformed when mated with a special female thread. Although this previous fastener combination is suitable for many applications, it is less than completely desirable in other applications since not all the male threads mating with the female threads are deformed; the male threads remain permanently deformed, even after the female thread is removed, consequently, this type of fastener is not particularly desirable for use in those applications where the fastener must be disassembled to allow for repairs, adjustments, replacement, etc. of the fastened parts. Although the components of such a fastener may be replaced in those situations where disassembly is necessary, this unnecessarily increases both labor and material costs.

Accordingly, it is a primary object of the present invention to provide a locking thread construction which eliminates lateral or radial type movement of the threads relative to each other which can lead to loosening of the fastener and in which tight frictional engagement is achieved between the male and female threads for several revolutions of the circumference of the threads.

Another object of the invention is to provide a locking thread construction in which one of the threads is of conventional design and becomes at least partially deformed when the male and female components of the fastener are threadably mated.

A still further object of the invention is to provide a fastener of the type mentioned above in which the deformed thread is reformed to its original shape when the male and female components are unthreaded.

Another object of the invention is to provide a locking thread construction for a fastener as described above which is at least free-running to some extent in order to allow the male and female components to be initially hand-threaded, but yet which may be locked without drawing both the male and female components tightly against the parts being fastened.

These and further objects will be made clear or will become apparent during the course of the following description.

DISCLOSURE OF THE INVENTION

In accordance with the present invention, a self-locking fastener combination is provided with a thread construction having a thread which deforms to lock the fastener when a set of male and female members are threaded together, and which is reformed to its original shape upon unthreading of the members to allow subsequent use thereof. The female member has a conventional thread formed therein, while the male member is provided with a special helical thread defined by leading and trailing flanks in which a portion of the leading flank diverges away from that of the female member to produce a helical space between the threads adjacent the male thread root. A portion of the male thread is truncated and possesses a diameter greater than the inside (smaller) diameter of the female thread such that part of the female thread crest firmly engages and is deformed by the truncated male thread root into the space adjacent such root when the members are threaded together. The deformed portion of the female crest extends around several turns of the thread to provide substantial metal-to-metal contact between the male and female threads, thereby eliminating the possibility of radial shifting between the members. Another portion of the male thread is complementally identical to the female thread and causes the deformed female crest to reform to its original shape when the members are unthreaded, thereby allowing the fastener to be reused without diminished locking action. The male thread may be formed using a die tool having a mirror image of the male thread defined thereon.

BRIEF DESCRIPTION OF THE DRAWINGS

In the drawings, which form an integral part of the specification and are to be read in conjunction therewith, and in which like components are designated by identical reference numerals in the various views.

BEST MODE FOR CARRYING OUT THE INVENTION

Figure 1:
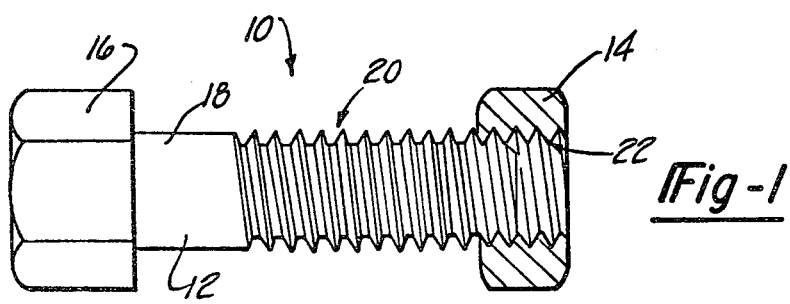
FIG. 1 is a longitudinal side view of a fastener combination employing the locking thread form comprising the preferred embodiment of the present invention, the female member having been threaded onto the first free-running thread of the male member and being broken away in cross-section.
Figure 2:
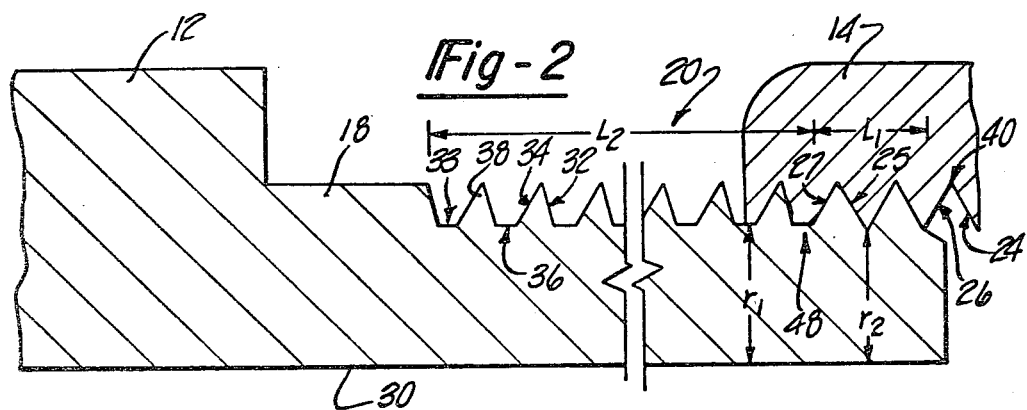
FIG. 2 is a fragmentary, enlarged cross-sectional view of the male and female members, showing the female thread matingly assembled with both the free-running and locking portions of the male thread of the male member.
Figure 3:
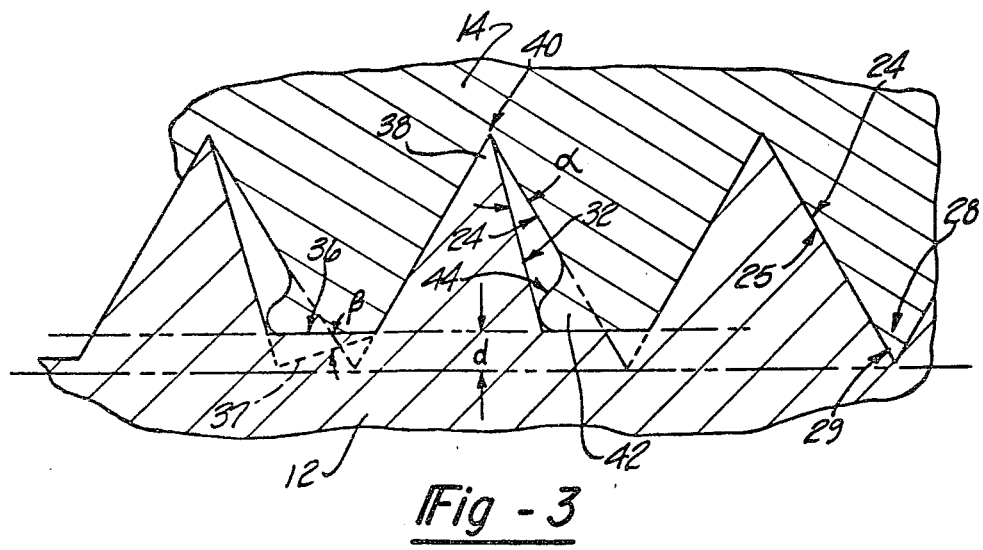
FIG. 3 is a detailed, enlarged fragmentary view of a length of the thread shown in FIG. 2 showing a portion of the female crest deformed by the locking portion of the male thread.

Referring first to FIGS. 1-3, a fastener combination generally indicated by the numeral 10 comprises a male member 12 in the form of a bolt having a wrench head 16 and a shank portion 18 provided with a helical male thread 20 formed thereon. The fastener combination 10 further includes a female member 14 in the form of a nut having a helical female thread 22 formed thereon.

A first length $L_1$ of the male thread 20 adjacent the free outer end of shank 18 is conventional in configuration, as will become apparent hereinafter, while the remaining length $L_2$ of the male thread 20 is of special configuration. The male thread 20 in the first length $L_1$ therefore is defined by leading and trailing flanks 25 and 27 which intersect at two points to form a male crest 38 and sharply angled male root 29. As particularly disclosed in the drawings, the leading and trailing flanks 25 and 27 form an angle which is approximately 60°, however, a wide range of angles is acceptable.

That portion of the male thread 20 along the length $L_2$ is defined by leading and trailing flanks 32 and 34 respectively which lie at corresponding third and fourth angles with respect to the longitudinal axis 30 and intersect at their outer radial extremity to define a sharply angled male crest 38. The leading and trailing flanks 32 and 34 converge radially inward to form a truncated male root 33. Male root 33 includes a root surface 36 extending between and transverse to the leading and trailing flanks 32 and 34. As shown in FIGS. 1 through 3, root surface 36 is essentially flat and extends substantially parallel to the longitudinal axis 30. However, root surface 36 may be inclined if desired, as shown in FIG. 3 by the broken line 37, at an angle $\beta$ with respect to axis 30 in order to accommodate variations in the depth of female thread 22 due to manufacturing tolerances. The angle $\beta$ may be between 0° and 60°.

The female thread 22 of member 14 is conventional in configuration and is defined by leading and trailing flanks 24 and 26 respectively which intersect to form a female crest 28 and female root 40. Female thread 22 is substantially a mirror image of the length $L_1$ of male thread 20, such that the male and female crests 28 and 38 respectively are complementarily received within the corresponding male root 29 and female root 40. Both of the trailing flanks 27 and 34 of male thread 20 lie at an angle with respect to the longitudinal axis 30 which is essentially equal to that of the trailing flank 26 of female member 14. The leading flank 25 of male thread 20 lies at an angle essentially equal to that of leading flank 24 of female member 14, however, as best seen in FIG. 3, the magnitude of the angle of leading flank 32 of male thread 20 is greater in magnitude than that of the leading flank 24 by an angle $\alpha$. As a result of this difference in angles, leading flank 32 diverges away from flank 24 in a direction radially inward to define a helically shaped volume of open space 44 between leading flanks 24 and 32, adjacent root surface 36.

The outside radius of the male thread 20, as measured from the male crest 38 to the longitudinal axis 30, is substantially uniform, and is essentially equal to that of the female thread 22. However, the inside radius $r_1$ of the male thread 20, as measured between the longitudinal axis 30 and root surfaces 36, is greater in magnitude than the inside radius $r_2$ of the female thread 22 as measured between the longitudinal axis 30 and female crest 28. This difference in inside radii of the male and female threads 20 and 22 respectively is designated by the letter d shown in FIG. 3.

As the male and female members 12 and 14 are threaded together, the female thread 22 initially mates with that portion of the male thread 20 along the length $L_1$ thereof so that the male and female threads are in a free-running state and may be turned the first few revolutions by hand. However, as the female crest passes a transition area, generally indicated at 48, crest 28, being of greater depth than the root surface 36, firmly engages the root surface 36 and substantial additional torque must then be applied either to the male member 12 or female member 14 in order to continue the threading operation. With the application of additional torque, the female crest 28 continues to firmly engage root surface 36 which results in a portion 42 of the female crest 28 being mushroomed or deformed laterally into the open volume of space 44. As torquing is continued, and the wrenching head 16 and female member 14 are drawn toward each other and the entire length of the female crest 28 is deformed into the open volume of space 44 such that the deformed portion 42 extends several revolutions around the male thread 20, thereby eliminating any possibility of lateral movement of one member relative to the other, even when subjected to severe shock or vibration.

Note that it is not necessary for the female member 22 to be torqued up to the end of the shank 18 adjacent the head 16 (or up against a part to be fastened between the opposing surfaces of wrench head 16 and female member 14) in order to lock the female member 14 on the male member 12 since the desired locking action occurs as soon as the female crest 28 is deformed. Additional locking action is achieved in the present fastener combination 10 by virtue of the fact that full flank-to-flank frictional engagement is present between the trailing flanks 27 and 34. The locking action is still further enhanced by the fact that, once deformed, the deformed female crest 28 is broader in width than the width of the male root 29 at the free outer end of male thread 20; consequently, the leading and trailing flanks 25 and 27 defining the male root 29 block the return of the deformed portion 42 of female crest 28.

In order to release and unthread the male and female members 12 and 14 respectively, a substantial reverse torque applied to one of the members causes the deformed portion 42 to be forced back through the male root 29, thereby reforming the deformed portion 42 to its original shape. Thus, the female crest 28 assumes its original angular shape after the members 12 and 14 have been unmated, and may therefore be reused (remated) a number of times, depending upon the hardness and the nature of the material comprising the female member 14.

The male member 12 is preferably heat treated, or case-hardened to an SAE grade 8 (metric grade 9.8) while the female member 14 is preferably an SAE grade 2. It is to be noted, however, that the desired locking function may be obtained even if the male and female members are equally soft, although in the event of equal softness, the members may not be threaded and unthreaded through as many cycles as is otherwise possible if the male member is of greater hardness than the female member. The female member 14 may be of greater hardness if a higher level of locking pressure is desired.

It is to be noted at this point that although the volume of open space 44 has been disclosed as being situated on one side of the female crest 28, the angles of the leading and trailing flanks 32 and 34 may be chosen such that the necessary volume of open space may be provided on each side of the female crest 28 whereby such crest is deformed laterally in opposite directions. However, by forming the open volume of space 44 on only one side of the female crest 28, full flank-to-flank contact between trailing flanks 26 and 34 is desirably achieved.

Figure 4:
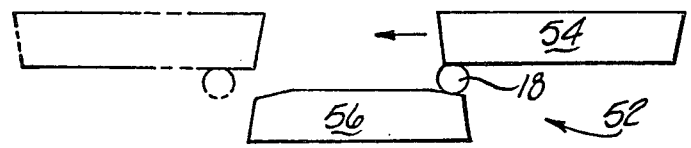
FIG. 4 is a plan view of the shank portion of the male member during forming of a thread thereon using roll plate thread die assembly.
Figure 5:
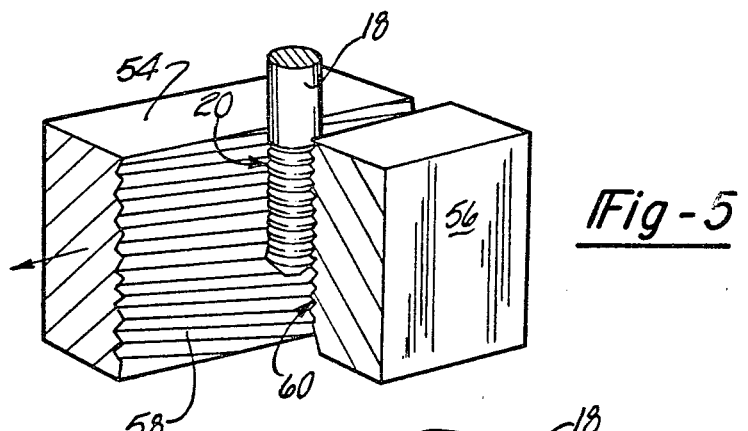
FIG. 5 is a perspective view of the roll plate die assembly, portions of one plate being broken away in section to reveal the shank and master threads defined on the faces of each die plate; and, FIG. 6 is a cross-sectional view taken through the roll plate die assembly of FIG. 6 showing the shank during threading thereof.
Figure 6:
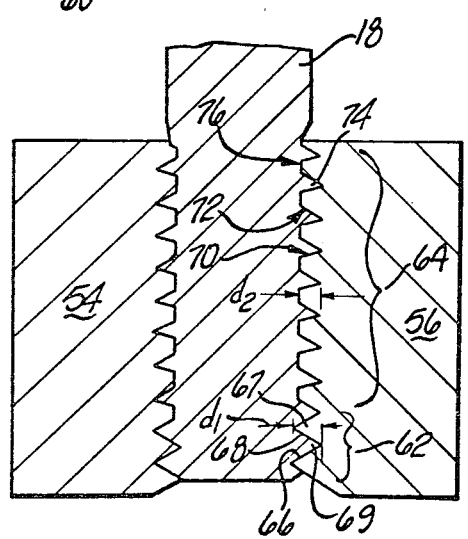

Referring now to FIGS. 4–6, the male thread 20 may be formed on the male member 12 using a roll die assembly comprising a pair of spaced roll plate dies 54 and 56 between which there is interposed a blank shank 18 upon which the male thread 20 is to be formed. Each of the die plates 54 and 56 includes a master thread formed on the face 58, 60 thereof. The die plates 54 and 56 are biased toward each other and against the shank 18 so as to impress the master threads onto the shank 18. At least one of the plates, such as plate 54 is moved in a direction parallel to the other plate 56 thereby rotating the circumferential surface of the shank 18 over the faces 58 and 60 of the plates 54 and 56 to form a continuous, helical thread 20 on the shank 18. As best seen in FIG. 6, each of the die plates 54 and 56 includes a first thread portion 62, adjacent one extremity thereof, defined by leading and trailing flanks 66 and 68 intersecting to form sharply angled crest 67 and root 69, the depth of the first portion 62 of the threads being designated by $d_1$. Each of plates 54 and 56 further includes a second thread portion 64 adjacent the first portion 62. The threads of the second portion 64 are formed by leading and trailing flanks 70 and 72 which define root 74 and truncated crest 76. The depth $d_2$ of the threads of second portion 64, as measured between the truncated crest 76 and root 74 is less in magnitude than depth $d_1$ of the first portion 62. It is thus clear that the master thread defined on the faces of the die plates 54 and 56 is essentially a mirror image of the male thread formed on the shank 18 shown in FIG. 2.

From the foregoing, it is apparent that the locking thread construction and die related thereto, not only provide for the reliable accomplishment of the objects of the invention but do so in a particularly effective and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

Having thus described the invention, what is claimed is:

1. A self-locking fastener combination, comprising:
   a first member having a helical thread formed thereon including leading and trailing flanks lying at respective first and second angles to the longitudinal axis of said fastener combination and which, before threaded engagement with another member, converge toward a crest of substantially constant diameter over the working length of said first member; and
   a second member matingly threadable with said first member and having a thread formed thereon including leading and trailing flanks converging toward each other to define a root for receiving the crest of said first member therewithin, said last named leading and trailing flanks lying at respective third and fourth angles with respect to said longitudinal axis, said root being truncated along at least a portion of the thread of said second member to provide a root surface extending between the corresponding leading and trailing flanks of said second member, said portion of the thread of said second member including the truncated root having a thread depth of lesser dimension than the thread of said first member in order to cause firm radial engagement of the crest of said first member with the root surface of said second member whereby to deform at least a portion of said crest, said third angle being greater in magnitude than said first angle whereby the leading flank of said first member diverges away from the leading flank of said second member associated with said thread portion to form an open space adjacent said root surface for receiving the deformed portion of said crest of said first member, the trailing flanks of said first and second members being in substantial face-to-face frictional engagement along said portion of the thread of said second member.

2. The fastener combination of claim 1, wherein said root surface extends essentially parallel to said longitudinal axis.

3. The fastener combination of claim 1, wherein said second and fourth angles are essentially equal and said face-to-face frictional engagement between said trailing flanks extends essentially the entire depth of the thread of said first and second member.

4. The fastener combination of claim 1, wherein another portion of the thread of said second member adjacent said portion thereof including said truncated root is provided with a thread depth greater in magnitude than the thread depth of said first member to allow free-running movement of the thread of said first member relative to said another portion of the thread of said second member.

5. The fastener combination of claim 4, wherein said second member is of a male configuration and said another portion of the thread of said second member is disposed on one extremity thereof.

6. The fastener combination of claim 1, wherein the leading and adjacent trailing flanks of the thread of said first member intersect to define an angular root in said first member, and the leading and trailing flanks of the thread of the second member intersect to form an angular crest in said second member disposed within and frictionally engaging the root of said first member.

7. The fastener combination of claim 1, wherein said first angle is approximately 15° less in magnitude than said third angle.

8. The fastener combination of claim 1, wherein said first member is of a female configuration.

9. A component for use in a self-locking fastener combination of the type including a female member having a helical thread formed thereon defined by leading and trailing flanks converging toward each other to provide a female crest, said component comprising:
   a male member matingly threadable with said female member and having a thread formed thereon including leading and trailing flanks respectively opposing the leading and trailing flanks of said female member and converging toward each other to provide a male root for receiving said female crest therein, said male root being truncated along at least one portion of the thread of said male member to define a root surface extending transversely between the leading and trailing flanks of said male member, the distance between the longitudinal axis of said fastener combination and said female crest being less in magnitude than the distance between said axis and said root surface whereby to produce firm frictional engagement between said female crest and said root surface and deformation of a portion of said female crest when the threads of said female member are threaded onto said one thread portion of said male member, at least a part of the leading flank of said male member in said one thread portion thereof being spaced from the opposing leading flank of said female member at a location adjacent said root surface to provide an open area adjacent said female crest for receiving the deformed portion of said female crest therewithin, the trailing flank of said male member being in face-to-face frictional engagement with the trailing flank of said female member along essentially the entire depths of said trailing flanks.

10. The component of claim 9, wherein the leading flank of said male member in said one portion thereof diverges away from the corresponding, opposing leading flank of said female member in a direction toward the longitudinal axis of said fastener combination.

11. The component of claim 10, wherein the last named flanks diverge away from each other at an angle of approximately 15°.

12. The component of claim 9, wherein said thread of said male member includes a male crest defined by the leading and trailing flank of said male member, and the thread of said female member includes a female root, said male crest being received within and frictionally engaging said female root along essentially the entire length of the thread of said female member.

13. The component of claim 9, wherein said root surface is essentially flat and extends substantially parallel to said longitudinal axis.

14. The component of claim 9, wherein another portion of the threads of said male member has a thread depth measured between the male root thereof and said longitudinal axis which is at least as great in magnitude as the thread depth of the threads of said female member measured between the female crest and said longitudinal axis.

15. The component of claim 14, wherein said male member has a free outer end and said another portion of the threads of said male member is disposed on said free outer end thereof.

16. The component of claim 15, wherein the leading and trailing flanks of said one portion of the thread of said male member converge toward each other at an angle of approximately 45° and the leading and trailing flanks of said another portion of the thread of said male member converge toward each other at an angle of approximately 60°.

17. A thread forming tool, comprising:
structure having a helical thread formed thereon,
said thread being defined by a leading and trailing flank converging toward each other at respective first and second angles with respect to the longitudinal axis of said thread to form a crest,
said crest being truncated along at least a portion of said thread to define a root surface extending between and transverse to said leading and trailing flank,
said first angle being greater in magnitude than said second angle.

18. A thread forming tool, comprising:
structure having a helical thread formed thereon,
said thread being defined by leading and trailing flanks converging toward each other to form a crest,
said thread including a first portion having a first thread depth and in which said leading and trailing flanks respectively lie at first and second angles with respect to the longitudinal axis of said thread,
said thread including a second portion having a thread depth less is magnitude than said first thread depth and in which said leading and trailing flanks respectively lie at third and fourth angles with respect to said longitudinal axis,
said third angle being greater in magnitude than said fourth angle.

19. The tool of claim 18, wherein the crest of said second portion of said thread is truncated to define a crest surface extending between and transverse to said leading and trailing flanks.

20. The tool of claim 18, wherein said first portion of said thread is defined on one end of said thread.

21. The tool of claim 18, wherein said second and fourth angles are essentially equal and said third angle is greater in magnitude than said first angle.

22. The tool of claim 18, wherein said structure includes first and second, essentially flat, opposed surfaces, each of said surfaces having a part of said thread defined therein.

* * * * *